United States Patent
Bruce et al.

(10) Patent No.: US 8,201,405 B2
(45) Date of Patent: Jun. 19, 2012

(54) CROSSOVER EXHAUST DUCT WITH FRONT INSIDE PASSAGE AND REAR OUTSIDE PASSAGE

(75) Inventors: Timothy Alan Bruce, Peoria, IL (US); Anwarul Karim, Peoria, IL (US); Scott Allen Thompson, Dunlap, IL (US); Robert Charles Griffith, Jr., Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 717 days.

(21) Appl. No.: 12/337,832

(22) Filed: Dec. 18, 2008

(65) Prior Publication Data

US 2010/0154416 A1 Jun. 24, 2010

(51) Int. Cl.
*F02M 25/07* (2006.01)
(52) U.S. Cl. ............ 60/605.2; 60/602; 60/323; 60/324
(58) Field of Classification Search ............ 60/605.2, 60/602, 321, 322, 323, 324; F02M 25/07
See application file for complete search history.

(56) References Cited

U.S. PATENT DOCUMENTS

| | | | | |
|---|---|---|---|---|
| 2,479,318 | A * | 8/1949 | Cramer, Jr. | 60/323 |
| 3,177,649 | A | 4/1965 | Tromel | |
| 3,488,944 | A | 1/1970 | Saletzki et al. | |
| 3,614,259 | A * | 10/1971 | Neff | 60/602 |
| 3,930,747 | A * | 1/1976 | Woollenweber | 60/605.1 |
| 4,159,627 | A * | 7/1979 | Monch et al. | 60/322 |
| 4,656,830 | A | 4/1987 | Ohno et al. | |
| 4,951,465 | A | 8/1990 | Torigai | |
| 5,822,986 | A | 10/1998 | Higashide | |
| 6,079,211 | A * | 6/2000 | Woollenweber et al. | 60/602 |
| 6,324,847 | B1 * | 12/2001 | Pierpont | 60/605.2 |

* cited by examiner

*Primary Examiner* — Quyen Leung
*Assistant Examiner* — Michael Andrews
(74) *Attorney, Agent, or Firm* — Finnegan, Henderson, Farabow, Garrett & Dunner, LLP; Jeff A. Ruppel

(57) ABSTRACT

A crossover for ducting exhaust produced by an engine. The crossover includes a front inside passage and rear outside passage. The front inside passage is configured to direct exhaust from one or more cylinders associated with a front of the engine to an inside volute of a turbocharger turbine. The rear outside passage is configured to direct exhaust from one or more cylinders associated with a rear of the engine to an outside volute of the turbocharger turbine. The inside volute is closer to the rear of the engine than the outside volute is.

13 Claims, 4 Drawing Sheets

CROSSOVER EXHAUST DUCT WITH FRONT INSIDE PASSAGE AND REAR OUTSIDE PASSAGE

TECHNICAL FIELD

The present disclosure relates to exhaust ducting, more particularly to exhaust ducting adapted to an exhaust system having divided manifolds and an exhaust gas recirculation (EGR) system.

BACKGROUND

Engine exhaust systems may include a variety of components, including exhaust gas recirculation (EGR) components. The mounting of these components on the engine or engine application may be difficult given size, temperature, and stress constraints. Adding to the difficulty, different applications may require exit of the exhaust in different directions, which may impact the mounting of exhaust and other components.

U.S. Pat. No. 5,822,986 (the '986 patent) shows an exhaust system including manifolds with pipes that bend around each other before combining into a common collector.

SUMMARY

In one aspect, the present disclosure provides a crossover for ducting exhaust produced by an engine. The crossover comprises a front inside passage and rear outside passage. The front inside passage is configured to direct exhaust from one or more cylinders associated with a front of the engine to an inside volute of a turbocharger turbine. The rear outside passage is configured to direct exhaust from one or more cylinders associated with a rear of the engine to an outside volute of the turbocharger turbine. In another aspect, the inside volute is closer to the rear of the engine than the outside volute is. The present disclosure also provides a power system using the crossover.

In still another aspect, the present disclosure provides a method of passing exhaust through the front inside passage associated with the front of the engine to the inside volute of a turbocharger turbine and passing exhaust through a rear outside passage associated with a rear of the engine to an outside volute of the turbocharger turbine. In yet another aspect, the inside volute is closer to the rear of the engine than the outside volute is.

Other features and aspects of this disclosure will be apparent from the following description and the accompanying drawings.

DETAILED DESCRIPTION

Figure 1:
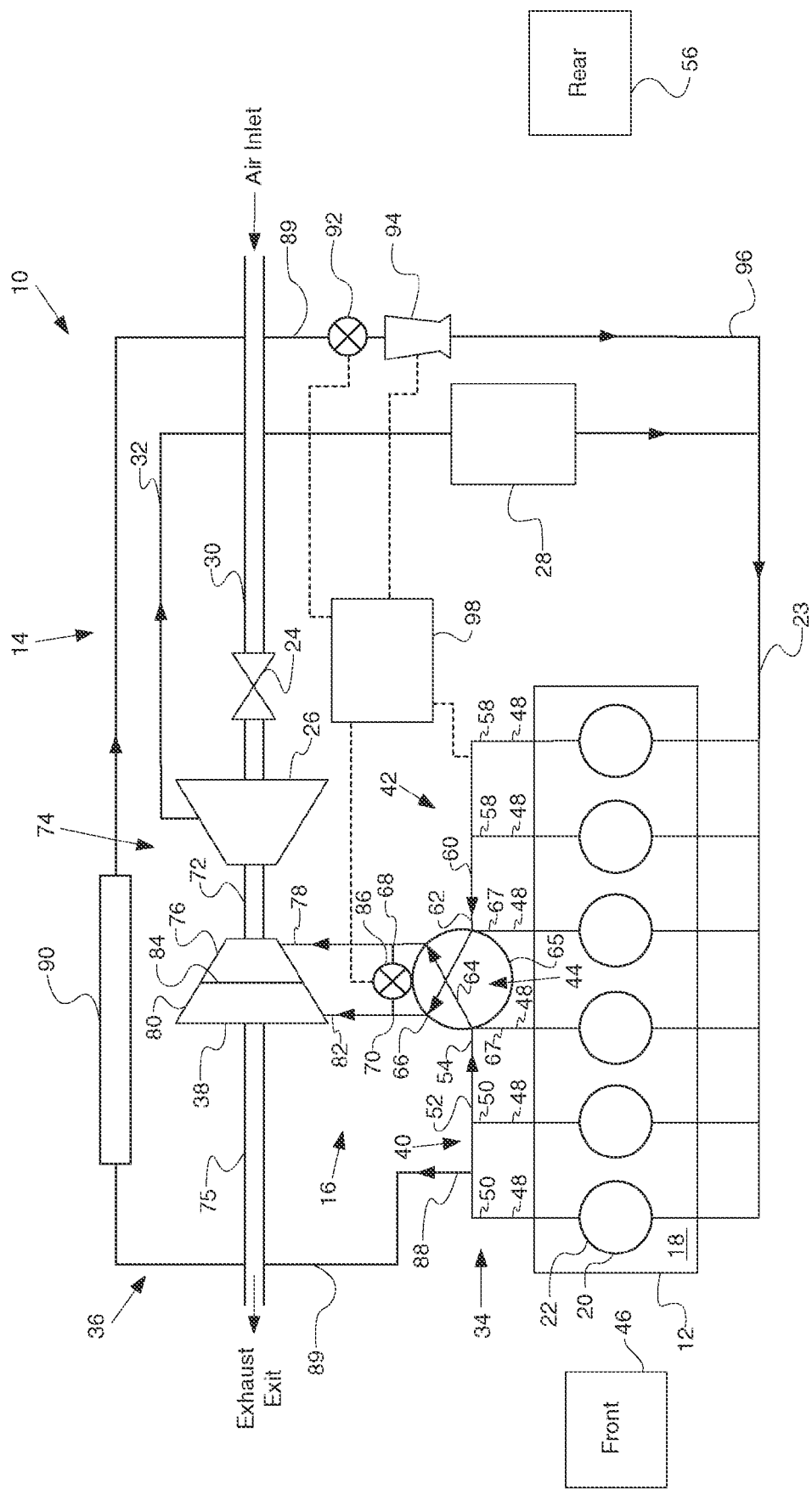
FIG. 1 is a diagrammatic view of a power system including an exhaust crossover.

FIG. 1 illustrates a power system 10 having a power source or engine 12, an air induction system 14, and an exhaust system 16. Engine 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Cylinder 20, the piston, and the cylinder head may form a combustion chamber 22.

In the illustrated embodiment, engine 12 includes six such combustion chambers 22 in an "in-line" configuration. However, it is contemplated that engine 12 may include a greater or lesser number of combustion chambers 22 and that combustion chambers 22 may be disposed in an "in-line" configuration, a "V" configuration, or in any other suitable configuration. The engine 12 may be any type of engine (internal combustion, gas, diesel, gaseous fuel, natural gas, propane, etc.). The engine 12 may be used to power any machine or other device, including on-highway trucks or vehicles, off-highway trucks or machines, earth moving equipment, generators, aerospace applications, locomotive applications, marine applications, pumps, stationary equipment, or other engine powered applications.

Air induction system 14 may include components configured to introduce charged air into an inlet 23 of the engine 12. For example, air induction system 14 may include an induction valve 24, one or more compressors 26, and an air cooler 28. Induction valve 24 may be connected upstream of compressor 26 via a inlet passageway 30 and configured to regulate the flow of atmospheric air to the intake 23 of the engine 12. Compressor 26 may be connected to engine 12 via a fluid passageway 32. Air cooler 28 may be disposed within fluid passageway 32, between the intake 23 and compressor 26. The air cooler 28 may embody, for example, an air-to-air heat exchanger, an air-to-liquid heat exchanger, or a combination of both to facilitate the transfer of thermal energy to or from the compressed air directed into engine 12.

The exhaust system 16 may include a manifold 34 and an exhaust gas recirculation (EGR) circuit 36. The manifold 34 fluidly connects the engine 12 with a turbine 38 and the EGR circuit 36.

The manifold 34 includes a front manifold 40, rear manifold 42, and a center manifold 44. The front manifold 40 receives exhaust produced by cylinders 20 associated with a front 46 of the engine 12 through exhaust ports 48. The exhaust travels from the exhaust ports 48, through front manifold legs 50, along front connecting pipe 52, and through a front manifold exit 54. The rear manifold 42 receives exhaust produced by cylinders 20 associated with a rear 56 of the engine 12 through exhaust ports 48. The exhaust travels from the exhaust ports 48, through rear manifold legs 58, along rear connecting pipe 60, and through a rear manifold exit 62.

The center manifold 44 includes two passages; a front inside passage 64 and a rear outside passage 66 that cross at a crossover 65 exhaust duct. The front inside passage 64 receives exhaust from the front manifold exit 54. The front inside passage 64 may also receive exhaust through one or more center manifold legs 67 from exhaust ports 48 associated with one or more cylinders 20 not delivering exhaust to the front or rear manifolds 40 or 42.

The rear outside passage 66 receives exhaust from the rear manifold exit 62. The rear outside passage 66 may also receive exhaust through one or more center manifold legs 67 from exhaust ports 48 associated with one or more cylinders 20 not delivering exhaust to the front or rear manifolds 40 or 42.

Exhaust in the front inside passage 64 exits through an inside exit 68 and exhaust in the rear outside passage 66 exits through an outside exit 70.

The turbine 38 is fluidly connected to the inside exit 68 and the outside exit 70 of the center manifold 44. The turbine 38 may be directly and mechanically connected to compressor 26 by way of a shaft 72 to form a turbocharger 74. The exhaust gases pass through the turbine 38 and expand against blades (not shown) and drive the connected compressor 26 to pressurize air back to the engine 12. The exhaust passing through the turbine 38 exits the power system 10 through an exit passageway 75.

The turbine 38 may include a divided housing having an inside volute 76 and an outside volute 80. The inside volute 76 may receive exhaust from the inside exit 68 through an inside inlet 78. The outside volute 80 may receive exhaust from the outside exit 70 through an outside inlet 82. Accordingly, the inside volute 76 may be associated with cylinders 20 from the front 46 of the engine 12 and the outside volute 80 may be associated with cylinders 20 from the rear 56 of the engine 12.

The inside volute 76 may be closer to the rear 56 of the engine 12 than the outside volute 80 and the outside volute 80 may be closer to the front 46 of the engine 12 than the inside volute 76. The front 46 and rear 56 of the engine 12 are relative distinctions and can be reversed.

A wall member 84 may divide inside volute 76 from outside volute 80. The inside volute 76 is located closest to the compressor 26 and may have a smaller cross-sectional area than outside volute 80. The smaller cross-sectional area of the inside volute 76 restricts the flow of exhaust from the cylinders 20 associated with the front 46 of the engine 12, thereby creating backpressure in the front manifold 40 and front inside passage 64 of the center manifold 44.

A balance valve 86 may also be included to fluidly connect the manifold 34 to the turbine 38. The balance valve 86 interconnects the front inside passage 64 and the rear outside passage 66 of the center manifold 44. The balance valve may be located between the turbine's 38 inside and outside inlet 78 and 82 and the center manifold's 44 inside exit 68 and outside exit 70. The balance valve 86 is configured to regulate the pressure of exhaust flowing through turbine's 38 inside and outside inlet 78 and 82. Accordingly, the balance valve 86 controls or regulates the flow of exhaust between the inside volute 76 and outside volute 80 and thereby controls the backpressure in the front manifold 40 and front inside passage 64.

The balance valve 86 may be any type of valve such as, for example, a non-cooled poppet or flapper style valve. In some embodiments, balance valve 86 may be a proportional valve, wherein the valve element may be moved to any position between first and second positions to selective adjust a restriction placed on the flow of exhaust by balance valve 86. Furthermore, the balance valve 86 may be solenoid-actuated, hydraulically-actuated, pneumatically-actuated or actuated in another manner to selectively restrict or completely block the flow of exhaust.

EGR circuit 36 directs a portion of the exhaust produced by engine 12 to the inlet 23 of the engine 12. The EGR circuit 36 may include an inlet port 88, EGR passageway 89, an EGR cooler 90, a recirculation control valve 92, sensor 94, and a discharge port 96.

EGR inlet port 88 may be fluidly connected to front manifold 40. The backpressure created by the turbine's 38 inside volute 76 causes the exhaust to travel via the EGR passageway 89 from the inlet port 88, through the EGR cooler 90, recirculation control valve 92, sensor 94, and discharge port 96. The discharge port 96 discharges the exhaust to the intake 23 of the engine 12.

The recirculation control valve 92 may be located to control the flow of exhaust recirculated through EGR circuit 36.

The recirculation control valve 92 may be any type of valve known in the art such as, for example, a flapper valve, a butterfly valve, a diaphragm valve, a gate valve, a ball valve, a poppet valve, or a globe valve. In addition, recirculation control valve 92 may be solenoid-actuated, hydraulically-actuated, pneumatically-actuated or actuated in any other manner to selectively restrict or completely block the flow of exhaust.

The EGR cooler 90 is configured to cool exhaust flowing through EGR circuit 36. EGR cooler 90 may include a liquid-to-air heat exchanger, an air-to-air heat exchanger, or any other type of heat exchanger known in the art for cooling an exhaust flow.

A controller 98 may be used to control the balance valve 86 or recirculation control valve 92 based on data from the sensor 94 or engine 12. Accordingly, flow through the EGR circuit 36 and turbine 38 can be regulated based on conditions.

Figure 2:
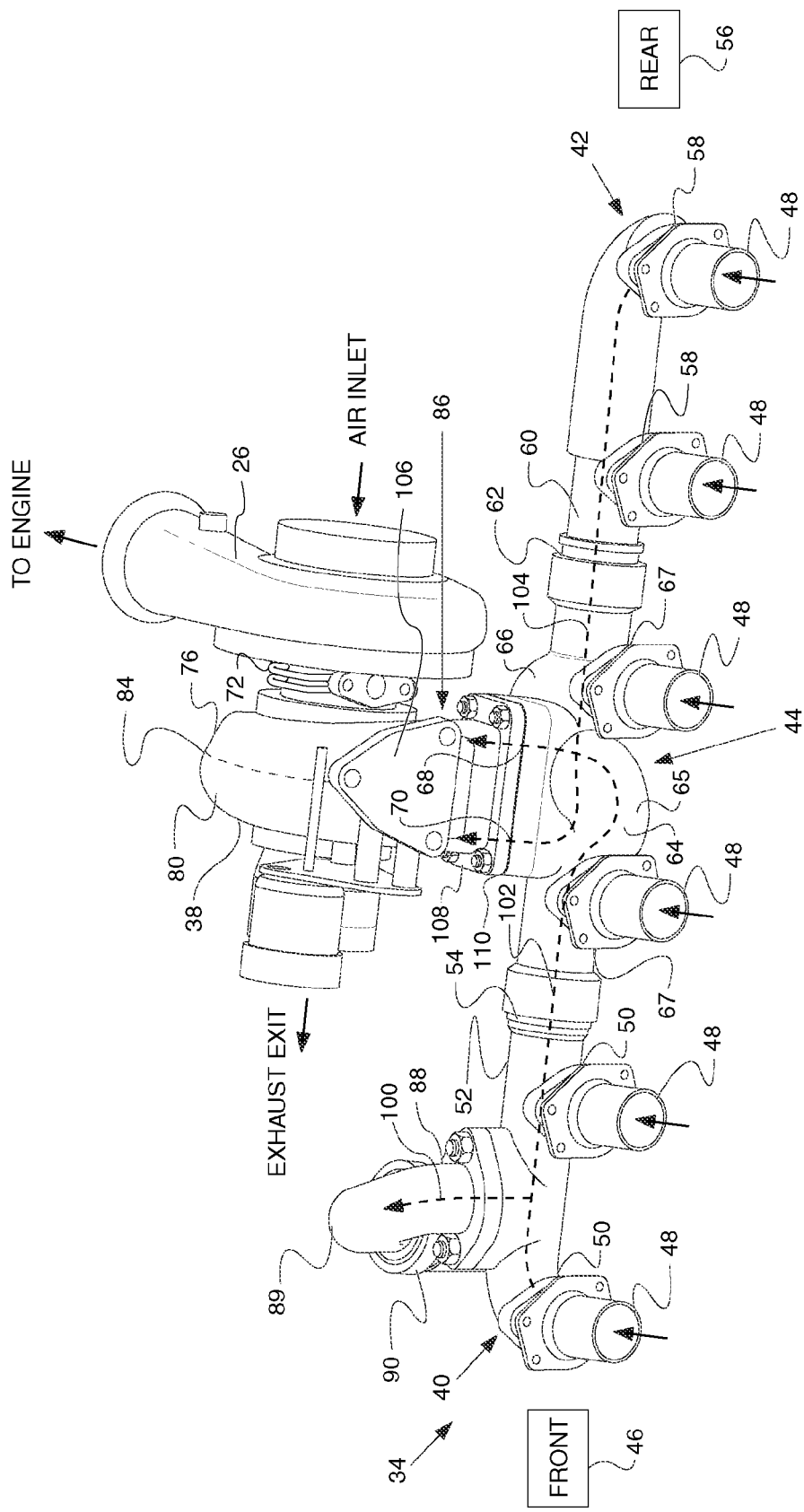
FIG. 2 is a perspective view of an exhaust manifold including the exhaust crossover coupled to a turbocharger.

FIGS. 2-5 show the center manifold 44 in more detail. FIG. 2 shows the manifold 34 coupled to the turbine 38 and inlet port 88 of the EGR circuit 36. Three flow paths are shown; an EGR flow path 100, a front exhaust flow path 102, and a rear exhaust flow path 104. The EGR flow path 100 passes through the inlet port 88 and into the EGR passageway 89.

The center manifold 44, along with the crossover 65, front inside passage 64, and rear outside passage 66, is shown formed as a common or single casting or integral piece. Other embodiments include separate components forming the center manifold 44, crossover 65, front inside passage 64, and rear outside passage 66. The front exhaust flow path 102 passes through the front manifold 40, into the front inside passage 64 of the center manifold 44, and to the inside exit 68. The rear exhaust flow path 104 passes through the rear manifold 42, into the rear outside passage 66 of the center manifold 44, and to the outside exit 70.

Figure 4:
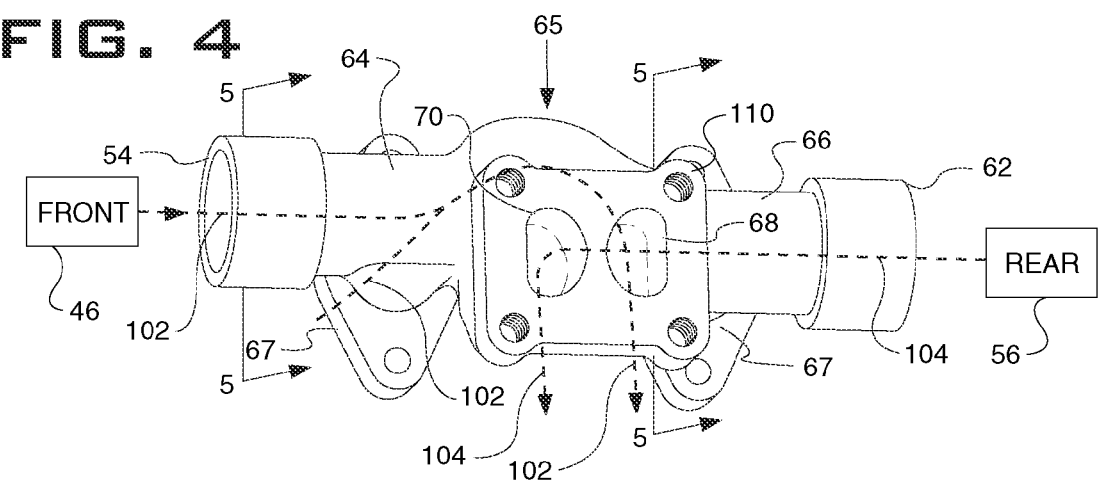
FIG. 4 is a perspective view of the center manifold of FIG. 3 rotated for illustrative purposes.
Figure 5:
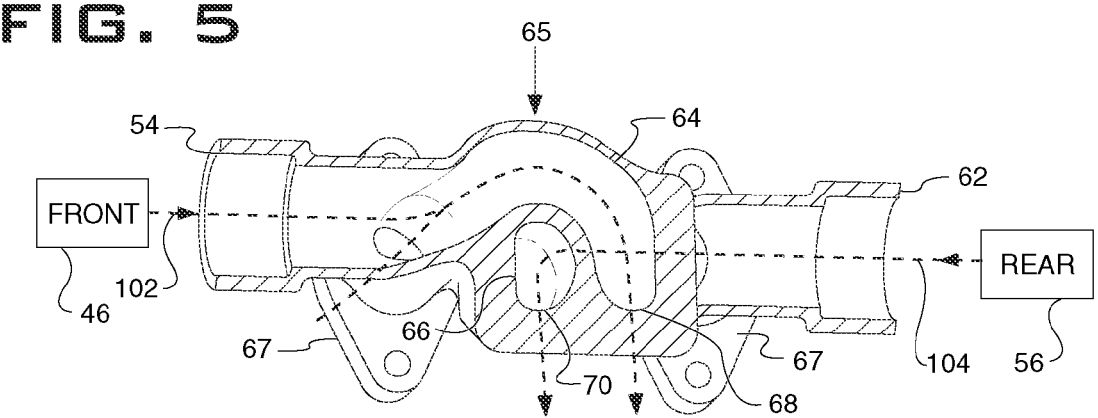
FIG. 5 is a cross-sectional view of the center manifold of FIG. 4.

FIG. 2 also shows a balance valve housing 106 mounted to the turbine 38 to contain the balance valve 86. The balance valve housing 106 is shown to include a balance valve flange 108 mated to a center manifold flange 110. FIG. 4 shows the center manifold flange 110 surrounding and dividing the inside exit 68 and outside exit 70.

Figure 3:
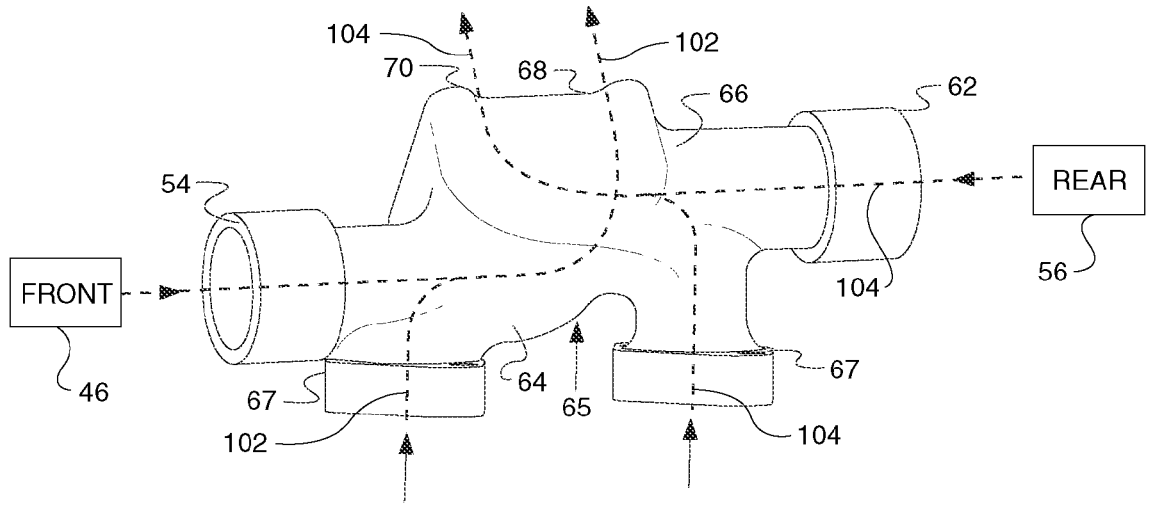
FIG. 3 is a perspective view of a center manifold including the exhaust crossover.

Seen best in FIGS. 3 and 4, the front exhaust flow path 102 is shown to pass behind the rear exhaust flow path 104 in the crossover 65. The rear exhaust flow path 104 is shown to pass in front of the front exhaust flow path 102 in the crossover 65. The front exhaust flow path 102 and rear exhaust flow path 104 cross so that the front exhaust flow path 102 at the inside exit 68 is closer to the rear 56 of the engine than the rear exhaust flow path 104 at the outside exit 70. Accordingly, the front exhaust flow path 102 and the rear exhaust flow path 104 comprise a path that allows the front exhaust flow path 102 to become closer to the rear 56 of the engine at the inside exit 68 than the rear exhaust flow path 104 at the outside exit 70.

The front exhaust flow path 102 is configured to deliver exhaust to the inside volute 76 of the turbine 38 when the balance valve 86 is closed and the turbine 38 is arranged with the outside volute 80 closer to the front 46 of the engine 12 than the inside volute 76. Likewise, the rear exhaust flow path 104 is configured to deliver exhaust to the outside volute 80 of the turbine 38 when the balance valve 86 is closed and the turbine 38 is arranged with the inside volute 76 closer to the rear 56 of the engine 12 than the outside volute 80.

INDUSTRIAL APPLICABILITY

Different machine applications may require exhaust to exit in different directions relative to the application or engine 12.

Figure 6:
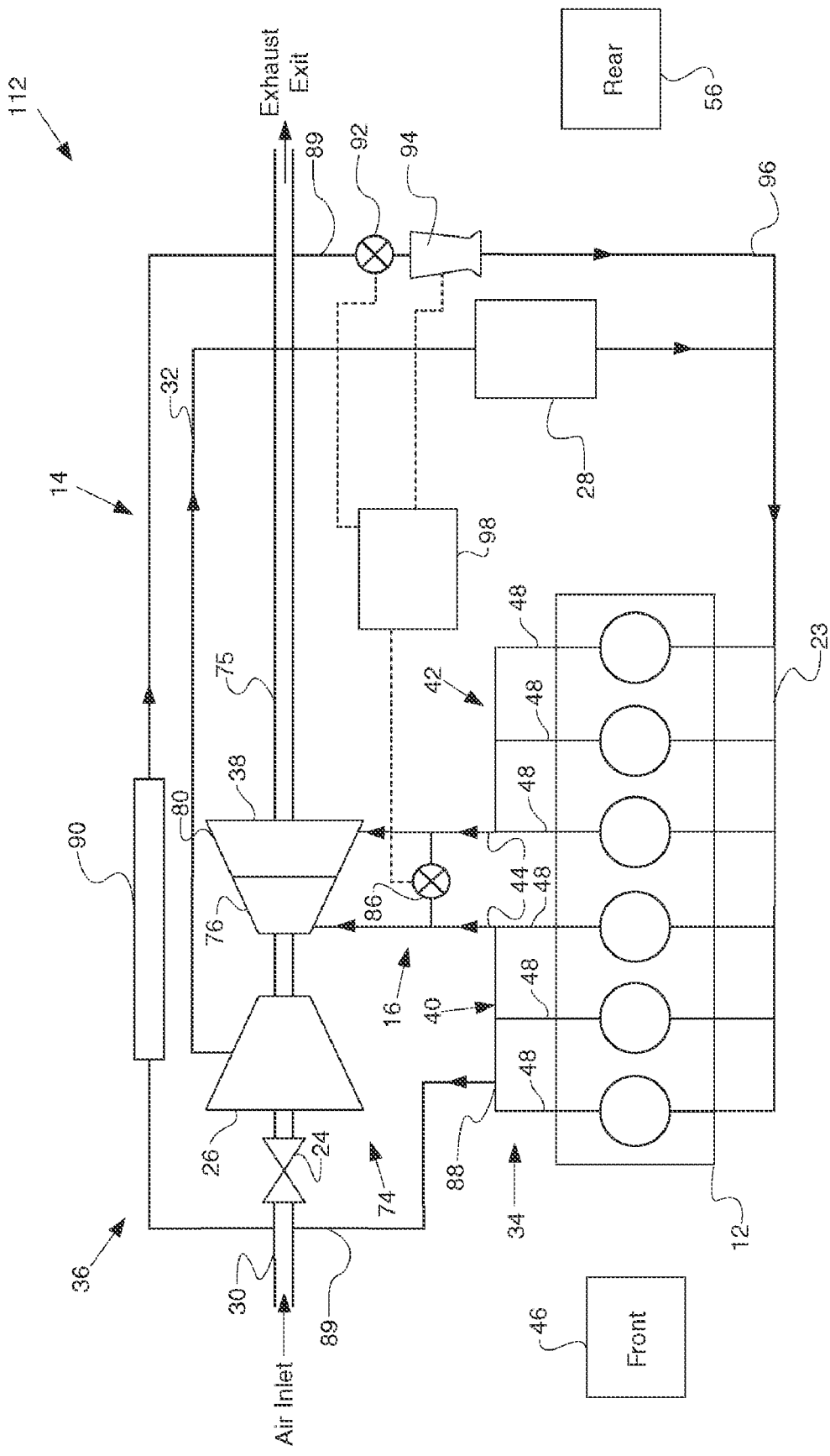
FIG. 6 is a diagrammatic view of a power system not including an exhaust crossover.

FIG. 6 shows a power system 112 with a rear exiting exhaust, compared to the power system 10 of FIG. 1 with a forward exiting exhaust. The turbocharger 74 was reversed in the power system 112 of FIG. 6 to achieve the different exhaust exit direction. Accordingly, the crossover 65 is not needed in power system 112 to direct exhaust from the front 46 of the engine 12 to the inside volute 76 or to direct exhaust from the rear 56 of the engine 12 to the outside volute 80.

Because the association of the front 46 and rear 56 of the engine 12 with the inside volute 76 and outside volute 80 was maintained via use of the crossover 65 in power system 10 and not in power system 112, many components can be mounted in the same location between the power systems 10 and 112. For example, the EGR inlet 88, EGR passageway 89, EGR cooler 90, and air cooler 28 may be able to be mounted in the same position in power system 112 as in power system 10. The common mounting of such components created by this adaptation provided by crossover 65 may help reduce the cost impacts of validating, manufacturing, servicing, and packaging power systems in applications requiring different exhaust exit directions.

A method is provided for directing exhaust by passing the exhaust through the front inside passage 64 associated with the front 46 of the engine 12 to the inside volute 76 and passing exhaust through the rear outside passage 66 associated with a rear 56 of the engine 12 to the outside volute 80. The method further includes passing exhaust through the front manifold 40 before the front inside passage 64 and passing exhaust through the rear manifold 42 before the rear outside passage 66. The method also includes passing a portion of the exhaust in the EGR circuit 36. Also included in the method is the passing of exhaust through the front inside passage 64 and rear outside passage 66 in a common center manifold 44. The method may also include passing the exhaust from the front inside passage 64 and rear outside passage 66 through a balance valve 86 that regulates flow of exhaust between the inside volute 76 and outside volute 80.

While the above description is directed to a crossover 65 and method used with an inline engine 12, in a center manifold 44, and as an adaptation for a front exiting exhaust power system 10 vs. a rear exiting exhaust power system 112, it is understood that the crossover 65 exist can be adapted to various other configurations. The crossover 65 may be used with other engine configurations and in any portion of the exhaust manifold 34 as an adaptation between power systems with varying arrangements to achieve commonality.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A crossover for ducting exhaust produced by an engine comprising:

a front inside passage configured to direct exhaust from one or more cylinders associated with a front of the engine to an inside volute of a turbocharger turbine;

a rear outside passage configured to direct exhaust from one or more cylinders located nearer to a rear of the engine than the one or more cylinders associated with the front of the engine to an outside volute of the turbocharger turbine; and wherein the inside volute is closer to the rear of the engine than the outside volute.

2. The crossover of claim 1 wherein:

the front inside passage receives exhaust from a front manifold associated with the front of the engine; and the rear outside passage receives exhaust from a rear manifold associated with the rear of the engine.

3. The crossover of claim 2 further including:

a exhaust gas recirculation (EGR) circuit fluidly coupled to the front manifold.

4. The crossover of claim 1 contained in a center manifold configured to receive exhaust from one or more engine cylinders.

5. The crossover of claim 1 wherein the front inside passage and rear outside passage are configured to deliver exhaust to a balance valve that regulates flow of exhaust between the inside volute and outside volute.

6. The crossover of claim 1 wherein the front inside passage and rear outside passage empty into a common manifold flange.

7. The crossover claim 1 wherein the front inside passage and rear outside passage are formed with a single casting.

8. A method of directing exhaust produced from an engine comprising:

passing exhaust through a front inside passage from one or more cylinders associated with a front of the engine to an inside volute of a turbocharger turbine; and passing exhaust through a rear outside passage from one or more cylinders located nearer to a rear of the engine than the one or more cylinders associated with the front of the engine to an outside volute of the turbocharger turbine;

wherein the inside volute is closer to the rear of the engine than the outside volute.

9. The method of claim 8 wherein the front inside passage crosses the rear outside passage.

10. The method of claim 8 further including:

passing exhaust through a front manifold before the front inside passage; and passing exhaust through a rear manifold before the rear outside passage.

11. The method of claim 10 further including:

passing a portion of the exhaust in the front manifold through a exhaust gas recirculation circuit.

12. The method of claim 8 further including:

passing the exhaust through the front inside passage and rear outside passage in a common center manifold.

13. The method of claim 8 further including:

passing the exhaust from the front inside passage and rear outside passage through a balance valve that regulates flow of exhaust between the inside volute and outside volute.

* * * * *